July 15, 1958 O. H. SCHADE 2,843,796

POWER SUPPLY REGULATION

Filed May 27, 1953

INVENTOR.
Otto H. Schade

BY [signature]

ATTORNEY 2,843,796

POWER SUPPLY REGULATION

Otto H. Schade, West Caldwell, N. J., assignor to Radio Corporation of America, a corporation of Delaware Application May 27, 1953, Serial No. 357,830

11 Claims. (Cl. 315—22)

The present invention relates to regulated power supply circuits and, more particularly, to "flyback type" high voltage power supply circuits operable from horizontal deflection circuits of television apparatus.

It has, in the past, been difficult to effect high voltage regulation in flyback power supply circuits because of the requirements of maintaining a fixed picture size, proper focus and good deflection linearity and this problem has proved to be particularly acute in the field of color television, as will be appreciated. One known manner of regulating the power supply circuit is to vary an auxiliary loading means on the circuit as a function of output potential variation. Since the high voltage circuit derives energy from a deflection output transformer, any variation in loading of the transformer by a regulation control circuit to compensate for variations of output potential must be done in such a manner that the deflection circuits are not caused to misfunction. Although regulation control may be provided when expensive deflection and high voltage circuits are afforded, supplying enough energy that variations in the load do not change the output potential, such devices are not commercially feasible.

As pointed out in an article by the present inventor entitled "High efficiency deflection systems" which appeared in the March 1950 issue of RCA Review, it has been found that a definite transformer ratio is required in a flyback type power supply system between the power output tube and the damping tube in order to insure proper operation. As will be explained more fully, the necessary turns ratio is a function of the sum of the power expenditures of the circuit, both during retrace and scanning intervals. Various proposals have been made in an effort to provide proper voltage regulation, including means for varying the efficiency of the power output tube as a function of the load variations, but it has been found that systems which operate on the potentials of the power output tube often lead to nonlinear operation of the deflection system. Further proposals requiring a multiplicity of additional circuit elements have also been made but these are subject to the criticism of costliness.

It is, therefore, a primary object of the present invention to provide improved flyback power supply circuits which maintain substantially constant potentials despite load variations.

Another object of the inveniton is that of providing a regulated power supply circuit, as set forth, which is particularly adapted for use in television receivers and which provides both constant output potential and proper deflection circuit operation.

A still further object of the invention is to provide an inexpensive yet dependable regulated power supply system which may be employed in conjunction with commercial deflection output circuits with a minimum number of alterations.

In general, the present invention, in recognition of the requirement that the sum of the power losses of the power tube's load circuit must be maintained constant despite load variations, provides means for adding more or less loss depending upon decreasing or increasing load deviations.

More specifically, according to one embodiment of the invention, a controllable A.-C. load is provided across a suitable portion of the transformer winding, which load comprises the plate impedance of a controllable electron tube, the conductivity of which is varied in accordance with a sginal obtained from the "D.-C. restoring circuit" normally used in television receivers. Since the output of the D.-C. restorer is a voltage which varies the average kinescope beam current (i. e., the high voltage load on the deflection system), the power loss in the controllable electron tube during retrace time when its anode is "pulsed" may be substituted for the varying high voltage power drawn by the load. In a second embodiment of the invention, a controllable electron tube deriving its signal from a D.-C. restoring circuit is employed as a variable direct current shunt load on the "boost capacitor" which forms a part of usual deflection systems as a power recovery means. Still another form of the invention employs a biased diode and an auxiliary winding of the transformer, the diode being biased in such manner that during retrace time, it causes current to flow in the auxiliary winding for low load conditions, thereby loading the transformer and limiting the high voltage output of the associated power supply.

Thus, it is another object of the invention to provide means, as set forth, for maintaining constant potential at the output of a fly-back power supply, which means operates as a function of the average video signal voltage as obtained from a D.-C. restoring circuit associated therewith.

Still another object is the provision of power supply regulating means employing a controllable A.-C. load across the transformer, which load varies during retrace intervals inversely with variations of the average kinescope power beam.

A further object is the provision of means including a biased diode and an auxiliary winding for loading the deflection transformer in a system of the type described in order to compensate for low power consumption during low load conditions.

Yet another object is to provide means including a grid-controlled electron tube for affording a variable D.-C. shunt load on a deflection circuit "boost capacitor" as a function of the variable kinescope load as controlled by the D.-C. restoring circuit voltage.

Additional objects and advantages of the present invention will become apparent to persons skilled in the art from a study of the following detailed description of the accompanying drawing, in which.

Figure 1:
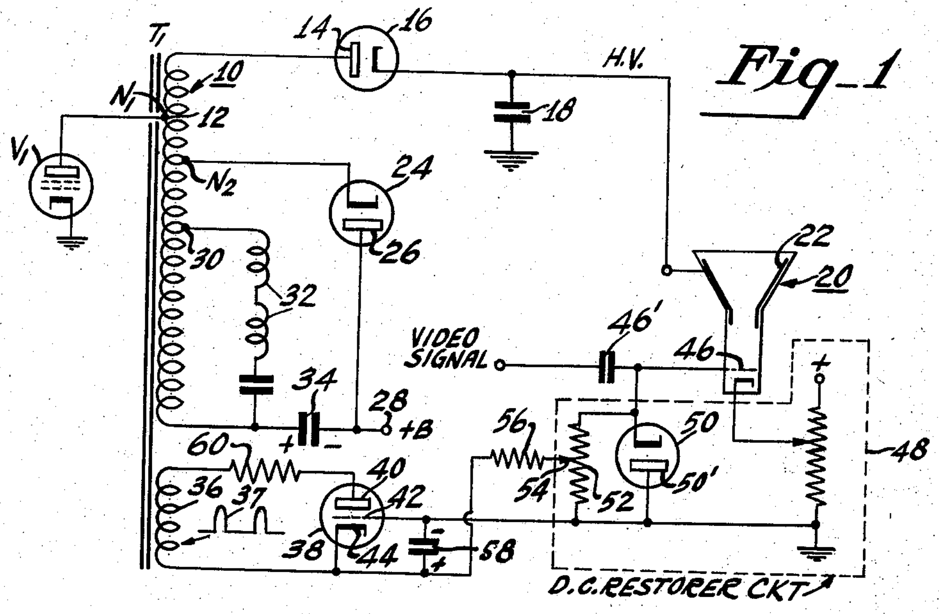
Fig. 1 illustrates, by way of schematic diagram, a circuit according to one embodiment of the invention.

As has been alluded to briefly supra, and as may be seen from a study of the above-cited RCA Review article, it is necessary in a system of the present type to have a definite transformer ratio between the horizontal power tube and the damping tube in order for efficient operation and linear deflection to be realized. Although typical circuits are described and illustrated in the article, Fig. 1, in the interest of completeness, includes the showing of a power tube $V_1$ or horixontal output tube which is conected to the winding 10 of an auto transformer $T_1$ at point 12. Additional turns of the winding 10 are connected to the anode 14 of a high voltage rectifier tube 16 which develops across capacitor 18 the high voltage which is applied to the utilization or load circuit. In this case, the load comprises a kinescope 20 having a final anode 22 to which the high voltage is applied from rectifier 16.

Across a portion of the winding 10 of transformer $T_1$ is connected a damper diode 24 whose anode 26 is connected to a source of positive potential 28 indicated as "+B," thus completing the D.-C. path for the anode circuit of power tube $V_1$. Across transformer $T_1$ at point 30 are connected the horizontal deflection coils 32. In series with the damper diode 24 is a "B-boost capacitor" 34, the operation of which is described and claimed in U. S. Patent No. 2,598,134, granted May 27, 1952, to the present applicant for "Power Conservation System." In general, the operation of the damper diode 24 in conjunction with the boost capacitor 34 is designed to divert otherwise wasted energy from the deflection transformer to the capacitor 34 which stores the same in additive relationship with the B+ supply, thereby decreasing the potential required at point 28 for the proper operation of the power tube $V_1$.

As thus far described, the apparatus of Fig. 1 is conventional as set forth in the cited article. Assuming the turns of transformer $T_1$ to be "$N_1$" at point 12 and "$N_2$" at the point of connection between the winding and the diode 24, the turns ratio necessary for efficient operation and linear deflection may be expressed as follows:

$$N_2/N_1 = 1 - \frac{(P_r + P_x)}{P_{in}}$$

where $P_r$ is the power loss during retrace time, $P_x$ is the power loss due to external shunt load across the series boost capacitor 34 and $P_{in}$ is the reactive power input to the plate circuit inductance (which substantially equals the product of the average plate current of power tube $V_1$ and the inductive voltage during trace time across the turns $N_1$). With this turns ratio, it will be appreciated that charge and discharge of the boost capacitor 34 are balanced. In most practical deflection systems, the power loss during retrace time $P_r$ is variable, since it includes high voltage power obtained from the rectified retrace pulse for operation of the kinescope, which varies as a function of the kinescope beam current. When the power $P_r$ or $P_x$ is increased, the boost capacitor 34 receives less charge from the diode 24, thus causing the total plate supply voltage for power tube $V_1$ to decrease. Such action, in turn, decreases the input power $P_{in}$ which further reduces $P_x$ and $P_r$ and, accordingly, the high voltage until a new equilibrium condition for the boost capacitor is obtained. When the loading of the circuit, by increasing $P_r$, is made too large, equilibrium may no longer be possible for the particular transformer ratio, thus causing the deflection to drop to zero. It is, therefore, important that the transformer turns ratio $N_2/N_1$ be adjusted according to the above equation to obtain linear deflection with the maximum load $P_r$ (i. e., the largest high voltage power output). As will be understood, when the load $P_r$ is decreased, the high voltage will increase and deflection linearity will also be changed.

Hence, it is a principle of the present invention to maintain substantially constant the sum of the power losses $P_r$ and $P_x$ through the agency of adding a controllable load $P_c$ to the deflection system, in order that deflection, linearity and high voltage may remain constant despite variations in kinescope brightness or beam current. Moreover, as will appear more fully hereinafter, the controllable load may be added to the losses $P_r$ during retrace time or as a D.-C. shunt load on the boost capacitor 34 (which is effective during the complete scanning cycle), or both. Stated otherwise, it has been found that when kinescope brightness is reduced from a maximum to a lower value, particular values of shunt resistance across the deflection circuit inductance or any part thereof may be calculated which will cause a power load $P_c$ on the system, which load is substantially equal to the decrease in power caused by the removal of the high voltage kinescope power, thereby causing the high voltage and deflection to return to their values at full brightness. It has also been found that a D.-C. load $P_c$ caused by a variable resistance across boost capacitor 34 may be found which when adjusted to the point where $P_c$ is equal to the decrease of $P_r$, will cause the high voltage, deflection, linearity and boost B+ to remain constant.

In view of the foregoing discussion, the apparatus of Fig. 1 will be understood as affording a controllable A.-C. load across a portion of the transformer $T_1$ during retrace time. More particularly, an auxiliary winding 36 of the transformer is connected to vacuum triode 38 which includes an anode 40, control electrode 42 and cathode 44. The triode 38 has no positive anode supply but depends for such potential on the pulses 37 induced in winding 36 and is normally biased to cutoff for conditions in which the kinescope 20 draws its maximum beam current. Control of the triode is accomplished in the following manner: To the signal or control electrode 46 of the kinescope is connected a D.-C. restoring circuit 48. The theory of operation of such circuits is described in detail, for example, in the U. S. Patent No. 2,194,514 granted to Willans et al., March 26, 1940, for "Television and Like Systems." Another example of a D.-C. restoring circuit may be found in U. S. Patent No. 2,569,297 granted September 25, 1951, to Duke et al. for "Direct Current Restoring Apparatus." Specifically, the restoring circuit indicated within the dotted-line box 48 includes a diode 50 connected between the kinescope control electrode 46 and a source of fixed potential such as ground. Across the diode 50 is a resistor 52, the junction of the resistor 52 and the anode 50' of diode 50 being connected to the control electrode 42 of triode 38. A movable tap 54 connects a suitable point on resistor 52 through an isolating resistor 56 to the cathode 44 of the triode 38. A capacitor 58 is, as shown, connected between the control electrode and cathode of the triode, so that, assuming the video signal which is applied through coupling capacitor 46' to the kinescope control electrode is polarized with "sync negative" (i. e., while positive), the D.-C. restoring circuit 48 will furnish a direct current potential across capacitor 58 which varies in inverse proportion with the average grid potential controlling the beam current within the kinescope 20 (which is, of course, a function of the video signal). Thus, when maximum beam current is drawn by kinescope 20 (corresponding to full load condition), the control electrode 42 of triode 38 is biased to cutoff, so that no current flows in auxiliary winding 36 during pulses 37. When the video signal applied to the kinescope is less positive, beam current in the kinescope will decrease, thereby rendering, through the agency of the D.-C. restorer circuit, the triode 38 conductive during retrace, the degree of conductivity depending upon the departure of beam current within the kinescope from its maximum level. In this manner, and by proper adjustment of the control voltage tap 54 the plate current and power loss resulting from the conduction of triode 38 through the winding 36 can be made equal to and substituted in "push-pull" fashion for the varying high voltage power drawn by the kinescope. If desired, the A.-C. load afforded by triode 38 may be adjusted and supplemented by a series resistance 60.

Figures 2, 3:
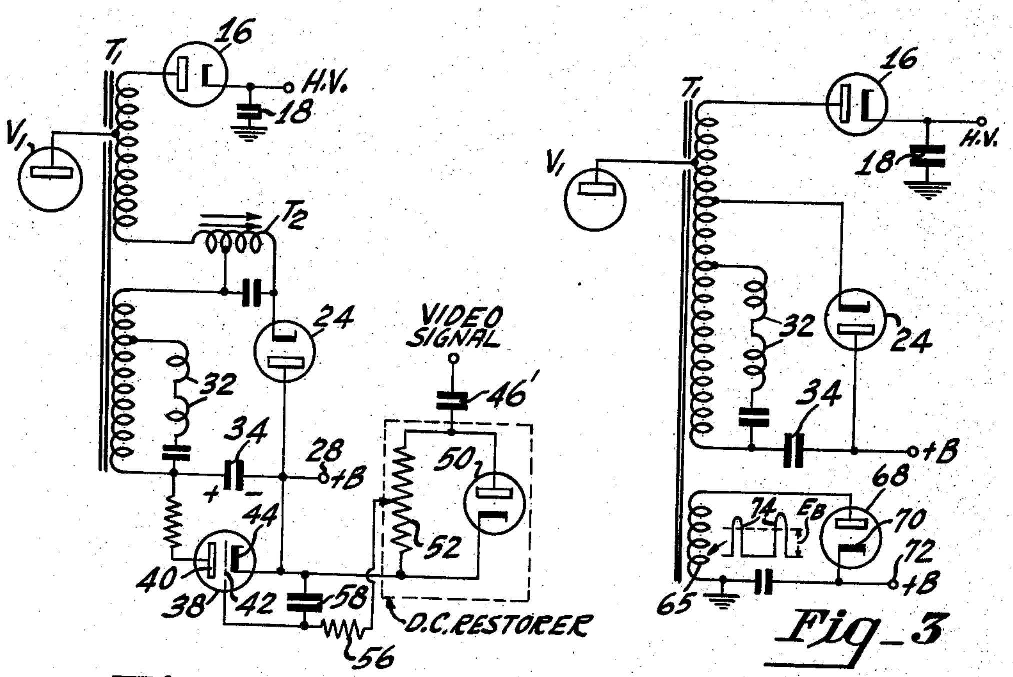
Fig. 2 is a schematic diagram of another form of the invention.
Fig. 3 illustrates, in a similar manner, still another embodiment of the invention.

Fig. 2 illustrates another embodiment of the invention which employs the output of the D.-C. restorer circuit as a means of measuring the current drawn by the load (kinescope) to afford a signal for varying a controllable load which is substituted during conditions of low current in the kinescope. Specifically, the apparatus of Fig. 2 includes a power tube $V_1$, auto transformer $T_1$ and high voltage rectifier 16—18, as in the case of Fig. 1. Also illustrated is a linearity control in the form of a tunable transformer $T_2$ in series with the damper diode 24. For the purpose of this disclosure, it is sufficient to note, with respect to the operation of the linearity control, that the voltage generated across winding $T_2$ is equal and opposite to the resistive voltage drop in the circuit which includes diode 24, yoke 32 and the boost capacitor 34, thereby, in effect, cancelling the effect of such circuit resistance to provide linearity of deflection. In other words, the linearity transformer $T_2$ cancels the effect of the series resistance in the anode circuit of power tube $V_1$ such that tube $V_1$ develops a power output equal to the diode circuit resistance loss.

A triode 38 is connected across boost capacitor 34 in such manner that its cathode 44 is connected to the junction of the capacitor and B+ terminal 28 and its anode 40 is connected to the other side of the capacitor. In order to illustrate the versatility of the present invention, it is assumed that in this case the video signal is applied to the cathode of the kinescope (not shown), for example, such that the signal is polarized with black (sync) positive. This is further brought out by the fact that the restorer diode 50 is connected in a reverse manner from that shown in Fig. 1. As in the case of Fig. 1, however, the D.-C. component of the video signal appears as a voltage across the resistor 52 so that a negative "sample" is afforded, by means of the filtering action of resistor 56 and capacitor 58, to the control electrode 42 of triode 38, which sample voltage is indicative of the average intensity of the video signal. In the apparatus of Fig. 2, as distinguished from that of Fig. 1, the anode 40 of triode 38 is connected to the positive side of capacitor 34 such that the triode may conduct during the entire scanning signal, assuming that its grid is not biased to cutoff. Hence, it will be appreciated by those skilled in the art that when the kinescope beam current is at its maximum, the potential between cathode 44 and control electrode 42 of the triode will be in a sense to prevent the tube from conducting. When the beam current decreases by reason of a more positive signal to the kinescope cathode, the potential difference between cathode 44 and control electrode 42 will decrease and proportionately increase the plate current of triode 38 thereby draining energy from capacitor 34. This reduction of the charge on capacitor 34, in turn, counteracts the increase in charge which capacitor 34 receives from diode 24 because of the decreased high-voltage load with the result that the voltage pulses during flyback, which are rectified by diode 16 do not increase. Thus, the high voltage afforded the kinescope final anode does not increase beyond its full load value.

The embodiment illustrated in Fig. 3 also includes a power tube $V_1$, auto-transformer $T_1$, high voltage rectifier diode 16 and filter capacitor 18 for furnishing high voltage potential to the kinescope anode (not shown). A damper diode 24 is connected across a suitable portion of the winding of transformer $T_1$ and is in series with a boost capacitor 34, the junction of the capacitor and diode being connected to a B+ source terminal. The deflection coils are again indicated at 32. This circuit further includes an auxiliary winding 65 on transformer $T_1$ across which is connected a diode 68 whose cathode 70 is connected to a constant source of positive potential 72 indicated by the indicia "+B." During flyback or retrace, voltage pulses such as those shown at 74 will be induced in the winding 65. Assuming that the diode 68 is biased by source 72 to a level which normally is the maximum value of pulses 74 for maximum beam current in the associated kinescope, the diode will not conduct during retrace. When, however, the kinescope beam current decreases, the pulses 74 tend to increase proportionately beyond the bias indicated at "$E_b$" in the waveform so that diode 68 is rendered conductive, thereby producing a power drain during such retrace intervals counteracting an increase of the pulse voltage. It will be noted that, in the embodiment of Fig. 3, the only components which need be added to conventional systems are the winding 65 and diode 68 which is, of course, an attractive feature insofar as cost is concerned.

Changes and modifications within the scope of the invention will further suggest themselves to persons skilled in the art.

Having thus described my invention, what I claim as new and desire to secure by Letters Patent is:

1. A high voltage flyback power supply, which comprises: deflection amplifying means having a load circuit which includes a transformer coupled to said means in current-receiving relationship therewith such that voltage pulses are developed in said transformer during retrace times, means for rectifying said pulses to produce substantially direct current voltage, a load coupled to said rectifying means, a source of signals of varying amplitude coupled to said rectifier load such as to cause said rectifier load to vary, means for deriving from said signals a control voltage representative of such amplitude variations, and means responsive to said last-named means for removing energy from said amplifier load circuit only during retrace times.

2. A high voltage flyback power supply, which comprises: deflection amplifying means having a load circuit which includes a transformer coupled to said means in current-receiving relationship therewith such that voltage pulses are developed in said transformer during retrace times, means for rectifying said pulses to produce substantially direct current voltage, a load coupled to said rectifying means, a source of signals of varying amplitude coupled to said rectifier load such as to cause said rectifier load to vary, means for deriving from said signals a control voltage representative of such amplitude variations and means comprising a winding of said transformer for removing energy from said amplifier load circuit in accordance with said control voltage.

3. A high voltage flyback power supply circuit for television apparatus which comprises: a source of deflection signals; a load circuit for said signal source which includes inductive means coupled to said source in current-receiving relationship therewith such that voltage pulses are developed in said inductive means during retrace time, means for rectifying said pulses to produce substantially direct current voltage, a load for said rectifying means comprising a cathode ray device coupled to said rectifying means, said cathode-ray device having a beam-intensity modulating electrode, a source of video signals, means for coupling video signals with their direct current component from said video signal source to said beam-intensity modulating electrode whereby to cause said rectifier load to vary in accordance with said direct current component; means coupled to said deflection signal load circuit for removing energy therefrom; and means coupling said direct current component from said video signal source to said energy-removing means.

4. A power supply as defined by claim 3 which includes an electromagnetic deflection circuit coupled to said deflection signal source; a damper tube and an energy-storing device in series with said deflection circuit; and wherein said energy-removing means is connected in energy-receiving relationship with said storage device.

5. A power supply as defined by claim 3 wherein said energy-removing means is inductively coupled to said inductive means.

6. A high voltage flyback power supply as defined by claim 3 wherein said means for coupling said video signals and their direct current component comprises a direct current restorer circuit.

7. A power supply as defined by claim 3 wherein said means for removing energy from said deflection signal source load circuit comprises an electron tube having a cathode, control electrode and anode and wherein said last-mentioned coupling means is connected electrically between said cathode and control electrode for controlling the conductivity of said tube.

8. A power supply as defined by claim 7 wherein the anode circuit of said electron tube includes an auxiliary winding inductively coupled to said first-named inductive means.

9. A high voltage flyback power supply which comprises; deflection amplifying means having a load circuit which includes a transformer coupled to said means in current-receiving relationship therewith such that voltage pulses are developed in said transformer during retrace time, means for rectifying said pulses to produce substantially direct current voltage, a load coupled to said rectifying means and variable in accordance with signals of varying amplitude applied to it; an auxiliary winding for said transformer adapted to develop voltage pulses corresponding to said first-named pulses and means including a diode and a source of bias potential therefor in circuit with said winding for permitting current to flow in said auxiliary winding when the magnitude of the voltage pulses in said auxiliary winding exceeds a predetermined level.

10. A high voltage power supply as set forth in claim 9 wherein said level is substantially equal to the potential of said bias source.

11. A high voltage power supply as set forth in claim 9 wherein said predetermined level is set as a function of the maximum value of said rectifier load.

References Cited in the file of this patent

UNITED STATES PATENTS

| | | |
|---|---|---|
| 2,577,112 | Duke | Dec. 4, 1951 |
| 2,651,739 | Chudleigh | Sept. 8, 1953 |
| 2,658,163 | De Cola | Nov. 3, 1953 |
| 2,697,798 | Schlesinger | Dec. 21, 1954 |